United States Patent
Fletcher et al.

[11] 3,814,083
[45] June 4, 1974

[54] APPARATUS AND METHOD FOR PROCESSING KOROTKOV SOUNDS

[76] Inventors: James C. Fletcher, Administrator of the National Aeronautics and Space Administration with respect to an invention of; Donald P. Golden, League City; George W. Hoffler; Roger A. Wolthuis, both of Seabrook, all of Tex.

[22] Filed: May 24, 1972

[21] Appl. No.: 256,317

[52] U.S. Cl. ................ 128/2.05 A, 128/2.05 S
[51] Int. Cl. .......................... A61b 5/02
[58] Field of Search.... 128/2.05 A, 2.05 G, 2.05 M, 128/2.05 P, 2.05 Q, 2.05 R, 2.05 S

[56] References Cited
UNITED STATES PATENTS

| | | | |
|---|---|---|---|
| 3,308,811 | 5/1967 | Gillette et al. | 128/2.05 M |
| 3,450,131 | 6/1969 | Vogt | 128/2.05 A |
| 3,621,836 | 11/1971 | Nagatomi | 128/2.1 B |
| 3,633,568 | 1/1972 | Hobel | 128/2.05 M |

OTHER PUBLICATIONS

Schulze et al., "Southwestern Institute of Electrical & Electronics Engineers Conference Record," Apr., 1968, pp. 17F1-17F5.

*Primary Examiner*—William E. Kamm
*Attorney, Agent, or Firm*—Marvin J. Marnock; John R. Manning; Marvin F. Matthews

[57] ABSTRACT

A Korotkov sound processor is disclosed which is used in a non-invasive, automatic blood pressure measuring system wherein the brachial artery is occluded by an inflatable cuff. The Korotkoff sound associated with the systolic event is determined when the ratio of the absolute value of a voltage signal representing Korotkov sounds in the range of 18–26 Hz to a maximum absolute peak value of the unfiltered signals first equals or exceeds a value of 0.45. The Korotkov sound associated with the diastolic event is determined when a ratio of the voltage signal of the Korotkov sounds in the range of 40 to 60 Hz to the absolute peak value of such signals within a single measurement cycle first falls below a value of 0.17. The processor signals the occurrence of the systolic and diastolic events and these signals can be used to control a recorder to record pressure values for these events.

3 Claims, 6 Drawing Figures

APPARATUS AND METHOD FOR PROCESSING KOROTKOV SOUNDS

ORIGIN OF THE INVENTION

The invention described herein was made in the performance of a NASA contract and is subject to the provisions of Section 305 of the National Aeronautics and Space Act of 1958, Public Law 85-568 (72 Statute 435; 42 USC 2457).

BACKGROUND OF THE INVENTION

This invention relates to a system for automatically measuring and monitoring the systolic and diastolic blood pressures in the human body and deriving such pressures independently of the activities or surroundings relative to the body.

The standard clinical method for the non-invasive measurement of blood pressure in man is called the Korotkov sound technique. With this technique, an inflatable pressure cuff is placed about the upper arm of an individual and is inflated by air pressure until the underlying brachial artery is occluded. By means of a manually operable valve, the pressure in the cuff is slowly reduced until blood commences to pass in spurts through the artery. This passage of blood through the partially occluded artery produces vibrations commonly referred to as Korotkov sounds. These sounds can be heard with the aid of a stethoscope placed over the artery below the cuff.

Systolic pressure is commonly referred to as that cuff pressure existent at the time the listener hears a sudden increase in the intensity of the Korotkov sounds. As cuff pressure is further reduced, Korotkov sounds will persist until the pressure reduction in the cuff is sufficient to permit a continuous flow of blood through the artery, at which time the sound will either rapidly diminish in loudness or disappear entirely. Diastolic pressure is commonly referred to as that cuff pressure existent at the time the listener hears a sudden reduction in intensity, or cessation, of the Korotkov sound.

There are many instances in clinical medicine and in research laboratories where the automation of this non-invasive Korotkov sound technique would be highly advantageous. A variety of such automatic systems have heretofore been proposed. Typically, these blood pressure measuring systems consist of a microphone for sensing Korotkov sounds, a cuff pressurization source, electronics circuitry for processing Korotkov sounds, and a technique for displaying systolic and diastolic blood pressure values. Of critical import with an automated system is the identification of the specific systolic and diastolic Korotkov sounds within each arm cuff pressurization cycle or ramp. This function is provided by a portion of the electronics circuitry which may be called the Korotkov sound processor.

In general, previous Korotkov sound processors have utilized various bandpass filters for the purpose of identifying these specific Korotkov sounds. The values for such bandpass filters have varied as a function of particular circumstances - for example, measurement of blood pressure under high ambient noise levels or comparison of blood pressure between an active and inactive person or under different physiological conditions. There are also a number of problems raised by the fact that the amplitude of such Korotkov signals can vary in an individual and can widely vary from individual to individual. None of the automatic systems heretofore proposed would be able to meet the requirements for a non-invasive automatic system for the measurement of arterial blood pressure which would be suitable for operation under varying conditions of rest and during orthostatic stress procedures and also before, during, and following ergometric stress with an accuracy equal to the currently accepted clinical auscultatory technique.

SUMMARY OF THE INVENTION

In an automated blood pressure measuring system wherein an inflatable cuff is used to occlude the brachial artery, the Korotkov sounds produced during gradual deflation of the cuff are sensed by a microphone having a flat frequency response characteristic over the range of 10-100 Hz. The microphone signals are amplified and filtered over this range and delivered to processing circuitry incorporating specific systolic and diastolic bandpass filters. The systolic bandpass filter has −3dB points at 18 and 26 Hz and the diastolic bandpass filter at 40 and 60 Hz. These frequency bands show the greatest change in spectral power which occurs with the Korotkov sounds associated with the systolic and diastolic events, respectively.

To determine the systolic event, the filtered systolic bandpass signal is converted to an absolute value and, in a systolic comparator, is compared to the peak absolute value of the unfiltered Korotkov sounds which serves as the ratio denominator. The systolic Korotkov sound is identified by the comparator as the first sound within a cuff deflation cycle whose ratio of the filtered (18-26 Hz) absolute value amplitude to the absolute value peak amplitude of the unfiltered Korotkov sounds equals or exceeds 0.45.

To determine the diastolic event, an absolute value conversion is made for each Korotkov sound signal filtered by the diastolic bandpass filter. The maximum peak value of this voltage within a single cuff ramp is held and serves as the ratio denominator to which the absolute value voltage for each subsequent instantaneous Korotkov sound is compared. The diastolic Korotkov sound is identified by the diastolic comparator as the first sound within the same cuff deflation cycle whose ratio of the filtered (40-60 Hz) absolute value amplitude to the peak filtered amplitude within the same cuff deflation cycle is less than 0.17. The processor signals occurrence of these events, and such signals control recorder display means for indicating cuff pressures corresponding to these events.

DESCRIPTION OF PREFERRED EMBODIMENT

Figure 1:
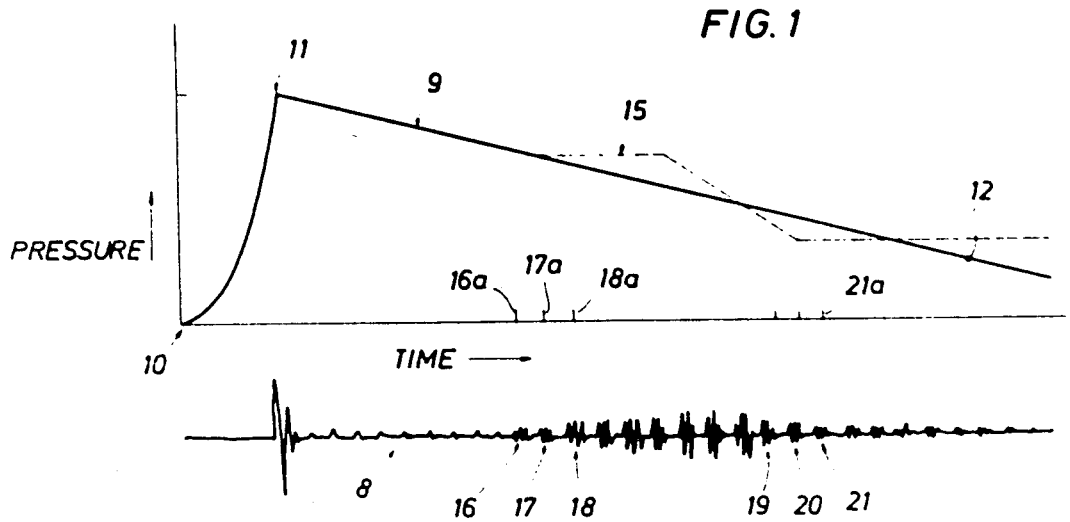
FIG. 1 is a representation of a pressure chart for a blood pressure cuff pressurization cycle and an electrical analog representative of a microphone signal from a microphone placed over the brachial artery during the cycle.

Before describing the system of the present invention, it may be helpful to review and describe the relationship of Korotkov sounds to blood pressure. In FIG. 1, a graph of arm cuff pressure versus time and an electrical analog representation of signals from a microphone placed over the brachial artery during a pressurization cycle are illustrated. A pressure curve 9 illustrates the magnitude of pressure in the pressure cuff from a point 10 where the cuff is deflated to point 11 where the cuff is inflated to a pressure sufficient to occlude the brachial artery to a point 12 where the cuff pressure is reduced sufficiently to permit blood flow normally through the artery. Over the same time period, the analog electrical voltage signals from the microphone which are representative of Korotkov sounds are illustrated in curve 8.

As in customary blood pressure measurement techniques, the pressure in the cuff is reduced by operation of a valve and decreases in a fairly uniform manner as indicated by curve 9, or the valve can be manipulated to first vary the rate pressure drop as illustrated by the dashed line 15. One particular reason for altering the rate of pressure release is that with a less drastic pressure release, detection of the Korotkov sounds at their onset and at their disappearance may be more accurately made. At the point of first appearance, it may be desirable to decrease the rate of pressure flow to permit a more precise determination of the pressure at the detection point.

As shown in FIg. 1, at point 11 an artery is completely occluded, and no distinctive sound should occur until such time thereafter as the artery begins to pass blood spurts. For detection purposes, whether it be electronic or physiological, there is a threshold detection level which, when reached, indicates to the physician that the systole pressure occurs. As shown in FIG. 1, sound pulses 16 and 17 may occur at times 16a and 17a before a systolic sound 18 occurs at time 18a. Between the sound pulse represented by the number 17 and the sound pulse represented by the number 18, it will be appreciated that there is a great change in intensity, which is the hallmark or characteristic of the systolic sound. Subsequently, the sound pulses reoccur and continue until the occurrence of sound pulses 19, 20, and 21, where a determination of a diastole can be made for sound pulse 21 at time 21a because of the greatest change in sound energy occurring at this time.

As mentioned heretofore, the amplitude of the sounds varies from individual to individual and can vary in individuals between sampling periods. It also varies as a function of the subject's activities.

Figure 2:
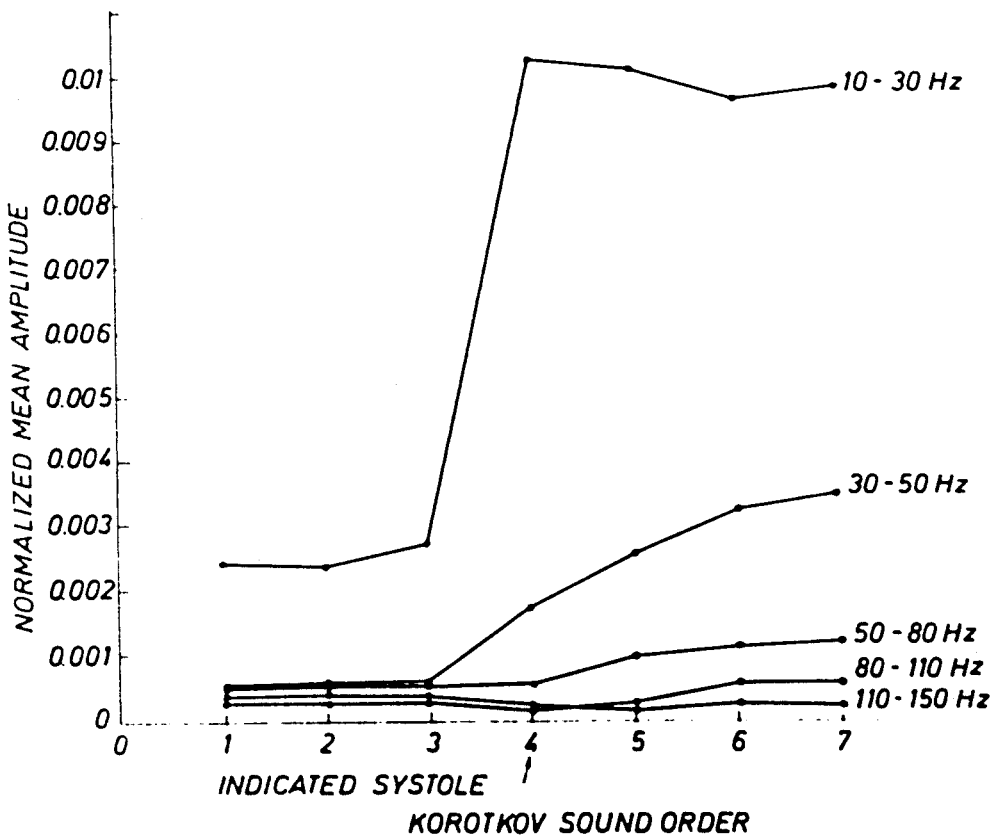
FIG. 2 is a graphic representation of Korotkov sound amplitudes in five frequency bands covering the range of 10-150 Hz as the arm cuff pressure transitioned down through systole

Referring now to FIG. 2, a graphic representation is shown where values for normalized mean amplitudes are plotted for seven consecutive sound pulses including the three pulses which immediately precede the sound pulse indicative of the systolic event and the three Korotkov sound pulses which immediately follow an indicated systole and over different frequency ranges of 10–30 Hz, 30–50 Hz, 50–80 Hz, 80–110 Hz, and 110–150 Hz. The data of the graph were obtained for each of the seven consecutive sound pulses during a single pressurization cycle in testing a representative subject. After collection, the data were processed for the five frequency bands above referred to. The data for each of these bands were plotted to ascertain data quality, and a Fourier transform was taken to produce spectral coefficients. For each of the seven sound pulses centered about the systolic event, the mean amplitude within each selected frequency band was computed and normalized by the peak-to-peak amplitude of the unfiltered Korotkov sounds. The following formula was used in normalizing:

$$NA = 1/n \sum_{f=f_{lo}}^{f=f_{hi}} C_f / RPPA$$

where $NA$ = normalized amplitude
$f_{lo}$ = lowest frequency in specific band
$f_{hi}$ = highest frequency in specific band
$C_f$ = coefficient of frequency exp $(-jft)$
$n$ = total number of coefficients included in the interval $f_{lo} < f < f_{hi}$
$RPPA$ = peak-to-peak amplitude of unfiltered Korotkov sound These normalized mean amplitudes were then plotted against the order of occurrence of the seven sound pulses within that frequency range. In the graph, the abscissae represent the seven sound pulses as they occur in sequence with the fourth pulse representing that pulse which indicated the systolic event. The five curves show the relative power in the five frequency bands as the cuff pressure transitions through systole.

A number of graphs as shown in FIG. 2 were obtained for the individual subject, one graph for each pressurization cycle, and pressurization cycles were run under conditions of rest and exercise and over a controlled priod of time. Similar data were also obtained and graphs plotted for a number of individuals. The data illustrated in FIG. 2 for one individual is typical of that obtained for the group.

In the above described determination of amplitudes, the cuff pressure was cycled automatically between 200 and 0 MM Hg once per minute during both rest and exercise protocols, and the bleed-down of the cuff pressure was from 160–60 MM Hg in 30 seconds and the occurrence of the Korotkov sounds was simultaneously determined by a physician using conventional auscultatory techniques.

Figure 3:
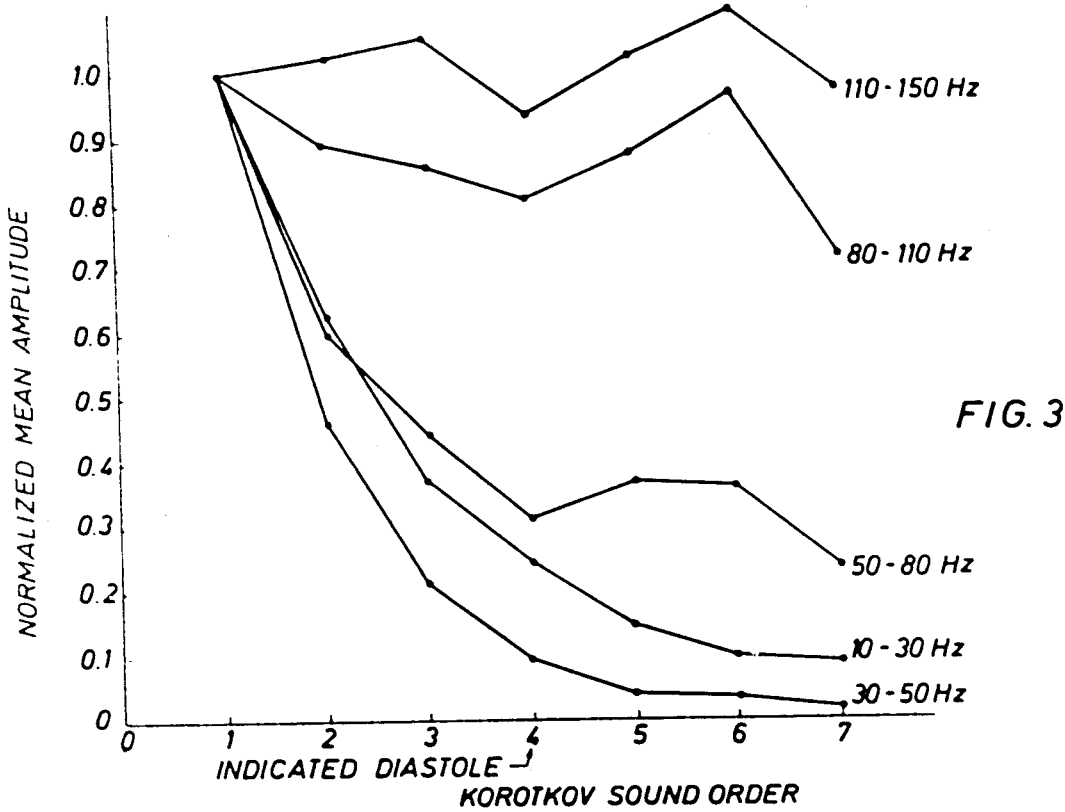
FIG. 3 is a graphic representation of Korotkov sound amplitudes in five frequency bands covering the range of 10-150 Hz as the arm cuff pressure transitioned down through diastole.

Referring to FIG. 3, a similar analysis was performed for the diastolic sounds. The data of the graph were obtained during a single pressurization cycle in testing a representative subject. The normalization process was different in that the seven mean amplitudes for each frequency band were normalized by the mean amplitude of the first sound in that band.

$$NA = 1/nNA_0 \sum_{f=f_{lo}}^{f=f_{hi}} C_f$$

where $NA_e$, $f_{lo}$, $f_{hi}$, $C_f$, $n$ are as defined previously and $$NA_e = 1/n \sum_{f=f_{lo}}^{f=f_{hi}} C_f$$

These data were plotted as shown in FIG. 3 wherein the abscissae represent the seven sound pulses as they occur in sequence with the fourth pulse representing that pulse which indicated the diastolic event. The data illustrated in FIG. 3 for one individual is typical of that obtained for the group.

The analyses of the wide band systolic and diastolic Korotkov sound data indicated that certain of the wide bands contained significant amplitude changes at the transition through the specific auscultatory event. These wide bands were subsequently subdivided into smaller units for the second or narrow band phase of this study in an effort to determine a minimum yet useful bandpass for obtaining systolic and diastolic decision information, respectively. The narrow bands chosen for the systolic sound analysis were 10–18, 18–26, 26–34, 34–42, and 42–50 Hz, covering the first two bands of the wide band phase. For the diastolic sound analysis the narrow bands were 40–45, 45–50, 50–60, 60–75, and 75–100 Hz, covering basically the third and fourth bands of the wide band phase. Data from the narrow band phase of analysis were computed and plotted in a manner similar to that of the wide band phase (see FIGS. 4 and 5).

Figure 4:
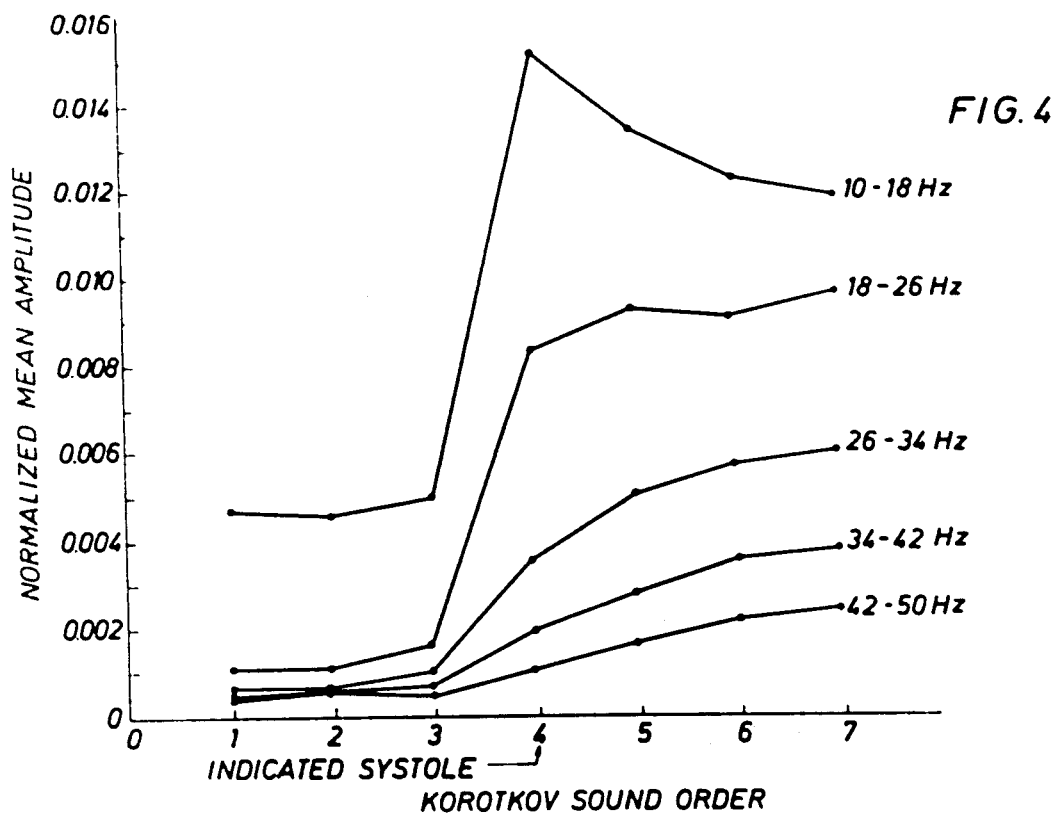
FIG. 4 is a graphic representation of Korotkov sound amplitudes in five frequency bands covering the range of 10–50 Hz as the arm cuff pressure transitioned down through systole.

A number of systolic plots as shown in FIG. 2 were analyzed, and from each of these plots it was found that only from 10 to 80 Hz did the normalized amplitude exceed 100 percent change in the plotted data. Amplitude change was most prominent in the range of 10 to 30 Hz and 30 to 50 Hz. Thus, plots were made for five discrete bands covering the 10 to 50 Hz range as illustrated in FIG. 4. The frequency range of 18 to 26 Hz ranked first in showing the greatest amplitude increase the greatest number of times from the data.

Figure 5:
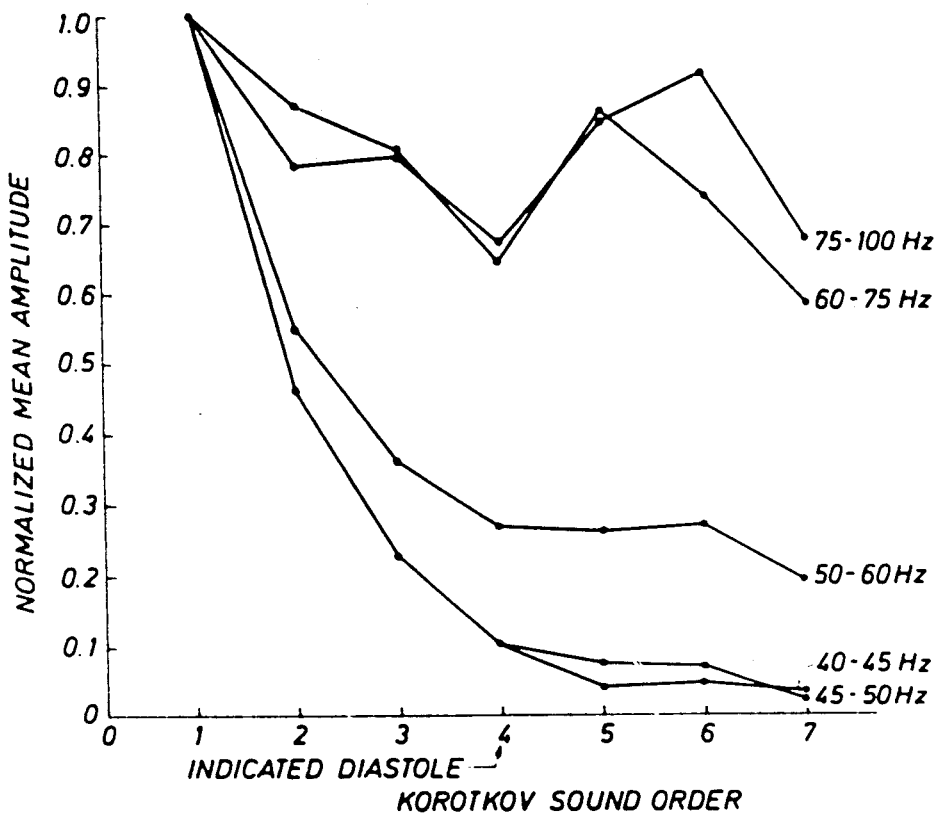
FIG. 5 is a graphic representation of Korotkov sound amplitudes in five frequency bands covering the range of 40–100 Hz as the arm cuff pressure transitioned down through diastole.

A number of diastolic plots as shown in FIG. 3 were analyzed to determine discrete frequency bands showing at least a 60 percent decrease in amplitude over seven sound pulses centered about the diastole event. The plots indicate that in the range of 30 to 80 Hz, a major shift in amplitude occurred. In FIG. 5, narrower bandpass ranges between 40 and 100 Hz were plotted, and it was found that the greatest amplitude changes occurred in the range of 40 to 60 Hz.

From these studies it is evident that there are significant changes in Korotkov sound spectral amplitude as the arm cuff pressure transitions down through systolic blood pressure and that these amplitude changes are greatest within an 18 to 26 Hz bandpass. Similarly, the range of 40 to 60 Hz for the diastolic pressure is shown to provide a significant change in amplitude at the diastolic decision point.

Referring once again to FIG. 1, a systolic Korotkov sound is identified by a sudden increase in sound intensity. By comparison of the filtered absolute value voltage to the unfiltered absolute value voltage a ratio value is obtained. For determining a diastolic ratio, successive Korotkov sounds are compared to a peak value for the filtered voltage.

To determine what the decision ratio values should be, data were collected during both rest and stress periods, and ratios were determined for each pressure cycle run per subject relative to a physician's auscultatory determination of the systolic and diastolic events.

From the results of the analysis, the systole can be defined as the first sound for which the absolute value of the output of the 18 to 26 Hz filter equals or exceeds 45 percent of the absolute value of the unfiltered sound. Diastole is defined by the occurrence of the first Korotkov sound for which the output of the 40 to 60 Hz filter has fallen to 17 percent of the maximum output of that filter during a single cuff pressure cycle. With this system, testing has shown that the systole can be located within one beat of the auscultatory determination for approximatley 90 percent of the time and the diastole within two beats at least 90 percent of the time.

Figure 6:
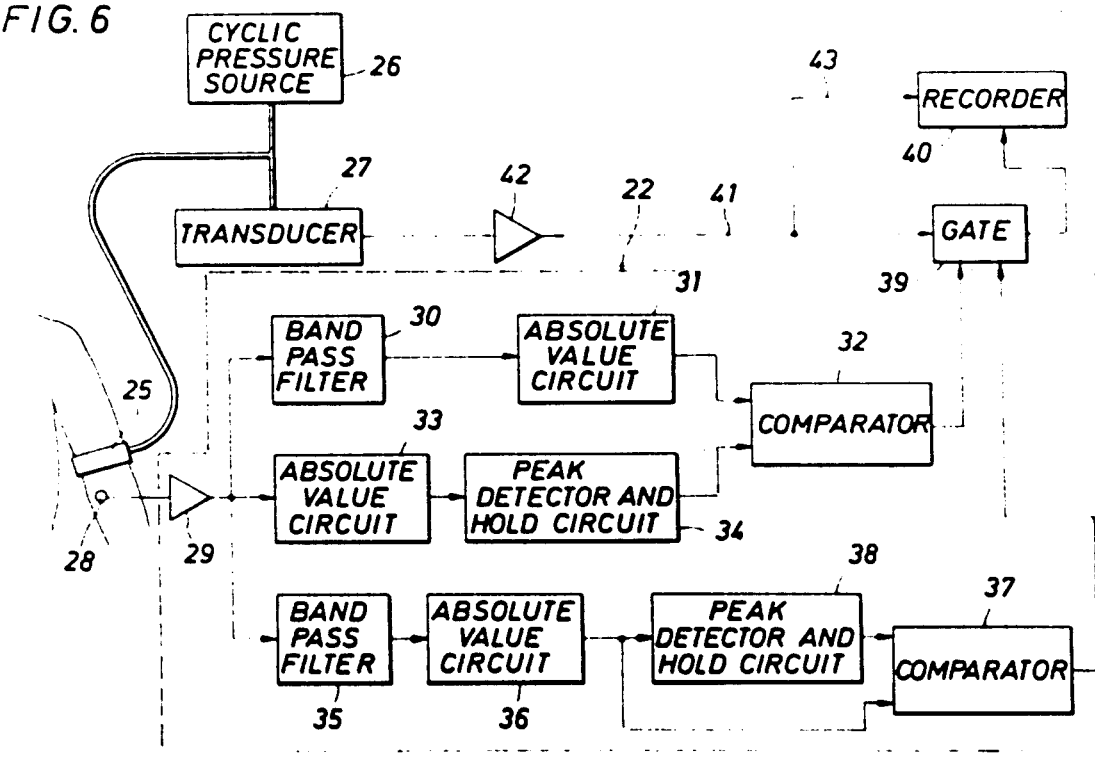
FIG. 6 is a schematic circuit diagram showing an automatic indirect blood pressure measurement system embodying the present invention.

Referring now to FIG. 6, a blood pressure measuring system incorporating the Korotkov sound processor 22 of this invention is illustrated for implementation of a determination of systolic and diastolic events independently of external factors. A pressure cuff 25 is fastened around the arm of an individual, and the pressure cuff is pressurized by a pressure source 26. The pressure cuff, of course, operates in the range of pressure measurement and for a time period and pressure rate as determined by the pressure source. A transducer 27 coupled to the pressure source provides an electrical output proportional to the pressure output of the source 26.

Below the cuff 25 is a microphone pick-up 28 which senses the sound from the brachial artery. The microphone has a flat frequency response characteristic over the range of 10–100 Hz. The microphone output is amplified by an amplifier 29 and is supplied to a systolic Korotkov sound detecting system comprised of two channels. One channel of the system has a bandpass filter 30 having a range from 18 to 26 Hz. These signals in the bandpass range are passed to an absolute value circuit 31 which provides output signals representative of the absolute values of the filtered input signal. The signals from the absolute value circuit 31 are passed to a comparison circuit or comparator 32.

The other channel of the systolic Korotkov sound detecting system includes an absolute value circuit 33 which provides absolute value signals to a circuit 34 which detects peak values and holds the maximum peak value detected. The output of the peak detector 34 is also supplied to the comparison circuit 32. The comparison circuit is constructed and arranged to consider the output of circuit 31 as a numerator value and the output of circuit 34 as a denominator and produce an output signal dependent on the ratio value of the two input values. The comparison circuit is further arranged to produce a positive voltage output signal only when the ratio value is equal to or greater than 0.45. The comparator may be a standard commercial item such as the National Semiconductor LM311 which is conventionally used as an amplifier with two operational states. Whenever the ratio is less than 0.45, the amplifier output is negative or zero; otherwise it saturates at full scale positive. The processor circuitry also includes a channel for diastolic Korotkov sound detection. This channel includes a bandpass filter 35 having a frequency range from 40 to 60 Hz. The output of the filter 35 is supplied to an absolute value circuit 36 which provides absolute value output signals. The signals from circuit 36 are supplied directly to a comparison circuit or comparator 37 and to a circuit 38 which detects peak values and holds the maximum peak value detected. The output of the peak detector 38 is supplied to the comparison circuit 37. Comparison circuit 37 receives the detector output 38 as a denominator value and the absolute value signal as a numerator and provides an output signal when the ratio value falls below a value of 0.17.

The output signals from comparator 32 and comparator 37 are supplied to control the operation of a gate circuit 39. When the gate circuit 39 receives signals from either comparator, the gate circuit is arranged to pass along to a recorder 40 by means of conductor 41 the signals from transducer 27 which are amplified by amplifier 42 and represent cuff pressure values for the time that the gate is operated. At the same time, transducer signals representing the entire pressure cycle can be received by the recorder by means of the conductor 43 which bypasses the gate 39 and directly couples the amplified transducer signals to the recorder. The signals representative of the pressure values at the time of the systolic and diastolic event can be converted or provided in digital as well as analog form for recording, as above noted, or for remote transmission as desired.

Obviously, the Korotkov sound processor and blood pressure measuring system described herein are readily adaptable to repetitive use in automatic systems wherein repeated measurements are taken. This is easily accomplished by utilizing a system reset pulse generated after the detection of the diastolic Korotkov sound. For example, this reset pulse could be derived from the outputs of the comparators. An alternative means would be to limit the hold time of the HOLD circuits.

From the foregoing description, it will be appreciated that the systolic and diastolic events are circumscribed and defined for universal application and interpretation under conditions of rest or stress and are independent of individual statistical deviations because of the normalization.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A Korotkov sound processor for use in a noninvasive blood pressure measuring system which includes an inflatable cuff for encircling a portion of the human body,
   means for alternately inflating and deflating said cuff for selectively occluding an arterial vessel, means for recording the arm cuff pressure values, and
   an electromechanical auscultatory transducer for monitoring the sounds of arterial flow past the cuff and for producing electrical signals containing frequency components representative of said sounds, said Korotkov sound processor comprising:
   filter means including a bandpass filter adapted to be coupled to the auscultatory transducer for selecting from said electrical signals the certain band of frequency components in the range of 18 to 26 Hz;
   detecting means coupled to said bandpass filter means for detecting the occurrence of the first significant increase in amplitude values of said selected signals for determining the systolic event as the pressure in said cuff is gradually reduced from a pressure sufficient to occlude the arterial vessel to a lower pressure which permits arterial flow, said detecting means including
   means coupled to said filter means for deriving first absolute value signals from said filtered signals,
   absolute value circuit means coupled to said auscultatory transducer for receiving the electrical signals from said transducer and for deriving second absolute value signals therefrom,
   means coupled to said absolute value circuit means for deriving peak amplitude value signals from said second absolute value signals;
   comparator means for comparing such derived first absolute value signals to said peak value signals to provide an output electrical signal whenever the amplitude ratio of said first absolute value signals and said peak value signals exceeds a value of 0.45; and
   means coupled to said comparator means for controlling said recording means.

2. A Korotkov sound processed as defined in claim 1 further including
   second filter means including a bandpass filter coupled to said auscultatory transducer for selecting from said electrical signals the certain band of frequency components in the range of 40 to 60 Hz; and
   means coupled to said second bandpass filter means and to said controlling means for detecting the occurrence of a significant decrease in amplitude values of said selected signals for determining the occurrence of the diastolic event and controlling said recording means in response thereto.

3. A method of measuring systolic and diastolic blood pressures in a human body comprising the steps of:
   applying an external pressure to an artery of said body sufficient to occlude arterial flow;
   diminishing said pressure over a period of time sufficiently to permit the systolic and diastolic events to occur;
   sensing the occurrence of arterial Korotkov sounds while the pressure is being reduced through said systolic and diastolic events, and producing first electrical signals containing frequency components representative of said sounds;
   selecting and filtering a band of frequency components in the range of 18 to 26 Hz from said first electrical signals;
   normalizing the amplitude values for said frequency band by the peak amplitudes of the unfiltered first electrical signals, said normalizing step including producing first absolute value voltage signals from said selected band of signals,
   a. producing second absolute value voltage signals from said first electrical signals representative of the arterial sounds,
   b. deriving peak value signals from said second absolute value voltage signals, and for each Korotkov sound, c. comparing the first absolute value signals to said peak value signals and producing an output electrical signal whenever the amplitude ratio thereof exceeds a value of 0.45 to thereby indicate the occurrence of the systolic event, selecting a second band of frequency components in the range of 40 to 60 Hz from said first electrical signals, for each successive Korotkov sound, normalizing the amplitude values for said second band of frequency components by the mean amplitude of the largest amplitude sound occurring in said second band, said last mentioned normalizing step including, a. producing third absolute value signals from said second selected band of electrical signals, b. producing second peak value signals from said third absolute value signals, c. comparing successive ones of said last mentioned absolute value signals to the largest amplitude peak value signal of said second peak value signals and producing a second output electrical signal whenever the comparison ratio thereof drops below a value of 0.17 to thereby indicate the occurrence of the diastolic event, and recording said first and second output electrical signals and the pressures applied to the artery while diminishing said pressures over said period of time to thereby provide an indication of arterial blood pressures at the time of occurrence of the systolic and diastolic events.

* * * * *